US011086285B2

(12) United States Patent
Morihashi et al.

(10) Patent No.: US 11,086,285 B2
(45) Date of Patent: *Aug. 10, 2021

(54) NUMERICAL CONTROL DEVICE, PROGRAM RECORDING MEDIUM AND CONTROL METHOD

(71) Applicant: FANUC CORPORATION, Yamanashi (JP)

(72) Inventors: Ryou Morihashi, Yamanashi (JP); Naoto Sonoda, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,934

(22) Filed: Nov. 27, 2019

(65) Prior Publication Data

US 2020/0174440 A1 Jun. 4, 2020

(30) Foreign Application Priority Data

Nov. 29, 2018 (JP) .............................. JP2018-223512

(51) Int. Cl.
*G05B 19/18* (2006.01)
*G05B 19/4155* (2006.01)
*G05B 19/416* (2006.01)

(52) U.S. Cl.
CPC ....... *G05B 19/182* (2013.01); *G05B 19/4155* (2013.01); *G05B 19/4163* (2013.01)

(58) Field of Classification Search
CPC .............. G05B 19/182; G05B 19/4155; G05B 19/4163
See application file for complete search history.

(56) References Cited

U.S. PATENT DOCUMENTS

2018/0281090 A1* 10/2018 Watanabe ................ B23G 1/02

FOREIGN PATENT DOCUMENTS

| CN | 105320075 A | * 2/2016 | ............. G05B 15/02 |
| JP | 2018-094690 A | 6/2018 | |
| WO | 2016/038687 A1 | 3/2016 | |

OTHER PUBLICATIONS

An Office Action mailed by the Japanese Patent Office dated Jun. 8, 2021, which corresponds to Japanese Patent Application No. 2019-196946 and is related to U.S. Appl. No. 16/698,934.

* cited by examiner

*Primary Examiner* — Chad G Erdman
(74) *Attorney, Agent, or Firm* — Studebaker & Brackett PC

(57) ABSTRACT

A numerical control device according to the present invention includes: an upper limit value acquisition unit which acquires an upper limit value for a cutting speed that is a relative speed of the cutting tool to the workpiece; a reference speed calculation unit which calculates a revolution number of the spindle, and a feedrate; an oscillation speed calculation unit which calculates an oscillation speed that is superimposed on the feedrate; a cutting speed calculation unit which calculates the cutting speed based on the revolution number of the spindle, the feedrate and the oscillation speed; and a speed adjustment unit which adjusts at least either one of the revolution number of the spindle and the feedrate, so that a maximum value of the cutting speed calculated by the cutting speed calculation unit does not exceed the upper limit value acquired by the upper limit value acquisition unit.

6 Claims, 3 Drawing Sheets

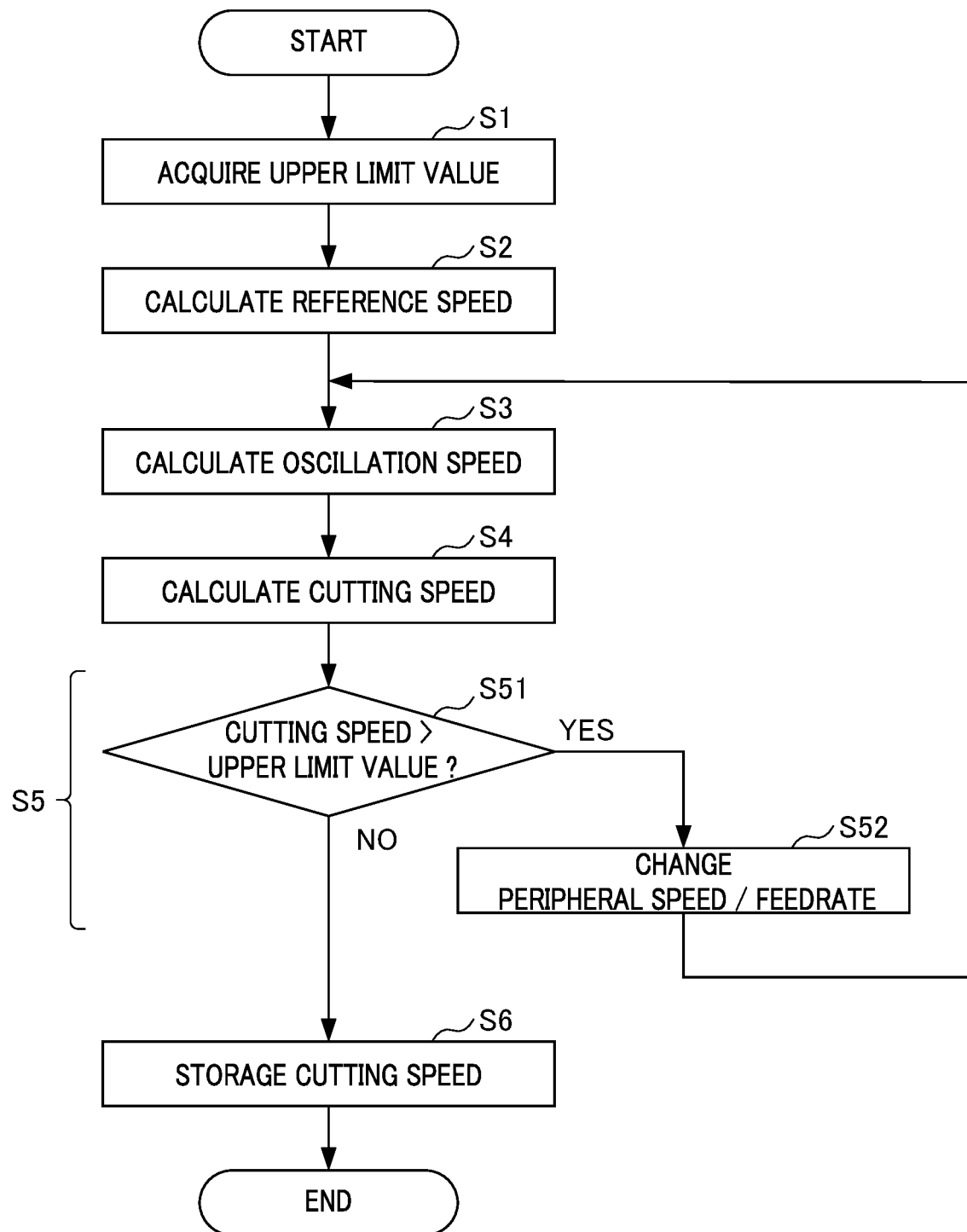

NUMERICAL CONTROL DEVICE, PROGRAM RECORDING MEDIUM AND CONTROL METHOD

This application is based on and claims the benefit of priority from Japanese Patent Application No. 2018-223512, filed on 29 Nov. 2018, the content of which is incorporated herein by reference.

BACKGROUND OF THE INVENTION

Field of the Invention

The present invention relates to a numerical control device, a program recording medium and control method

Related Art

Conventionally, a machine tool has been known such as a lathe, for example, which includes a spindle that causes a cutting tool and workpiece to move relatively, and a feed axis which causes the cutting tool to move relative to the workpiece, and cuts the workpiece by way of the cutting tool by causing the spindle and feed axis to operate cooperatively.

In addition, with a machine tool such as a lathe, since the cutting edge of the cutting tool continuously cuts off material on a surface of the workpiece, the material cut off becomes long thin shavings (chips) depending on the material properties of the workpiece, and there is a possibility of hindering the machining of the workpiece by clinging to the cutting tool. In contrast, as described in Patent Document 1, for example, technology has been known which performs oscillating cutting of reciprocally moving the cutting tool relative to the workpiece at a predetermined vibration frequency. With oscillating cutting, since the cutting tool is periodically separated from the workpiece by way of reciprocally moving the cutting tool, the shavings are shredded to a certain length.

Patent Document 1: Japanese Unexamined Patent Application, Publication No. 2018-94690

SUMMARY OF THE INVENTION

In the case of performing oscillating cutting which reciprocally moves the cutting tool in the aforementioned way, since the feed rate of the cutting tool varies cyclically, the cutting speed, which is the relative speed of the cutting tool and a surface of the workpiece, becomes regularly higher. In general, the range of cutting speed in which appropriate cutting is possible is limited depending on the cutting tool and the material properties of the workpiece, etc. If the cutting speed becomes excessively large, various troubles may arise such as roughness in the workpiece machined surface due to the generation of chattering vibration, excessive load or fatigue on the drive mechanism of the machine tool, abnormal wear of cutting tool. For this reason, with a conventional machine tool, in the case of performing oscillating cutting, it is necessary to set the rotation speed of the spindle and feedrate of the tool to be sufficiently low so that the cutting speed of the cutting tool does not become excessive, in consideration of fluctuations in speed of the cutting tool.

Therefore, the present invention has an object of providing a numerical control device, a program, and a control method which can prevent the cutting speed of a cutting tool from becoming excessive upon performing oscillating cutting.

A numerical control device (the numerical control device 1 described later) according to the present invention is a numerical control device a for controlling a machine tool (the machine tool 100 described later) which includes: at least one spindle (the spindle Ac described) for causing a cutting tool (the cutting tool T described later) and a workpiece (the workpiece W described later) to rotate relatively, and at least one feed axis (the feed axis Az described later) which causes the cutting tool to move relative to the workpiece, and cuts the workpiece by way of the cutting tool by causing the spindle and the feed axis to cooperatively operate, the numerical control device including: an upper limit value acquisition unit (the upper limit value acquisition unit 13 described later) which acquires an upper limit value for a cutting speed that is a relative speed of the cutting tool to the workpiece; a reference speed calculation unit (the reference speed calculation unit 14 described later) which calculates a revolution number of the spindle, and a feedrate that is a movement speed of the feed axis; an oscillation speed calculation unit (the oscillation speed calculation unit 15 described later) which calculates an oscillation speed that is superimposed on the feedrate; a cutting speed calculation unit (the cutting speed calculation unit 16 described later) which calculates the cutting speed based on the revolution number of the spindle, the feedrate and the oscillation speed; and a speed adjustment unit (the speed adjustment unit 17 described later) which adjusts at least either one of the revolution number of the spindle and the feedrate, so that a maximum value of the cutting speed calculated by the cutting speed calculation unit does not exceed the upper limit value acquired by the upper limit value acquisition unit.

According to the second aspect of the present invention, in the numerical control device as described in the first aspect, the speed adjustment unit may cause a ratio of adjustment amounts of the revolution number of the spindle and the feedrate to change in accordance with a machining program.

According to a third aspect of the present invention, in the numerical control device as described in the first or second aspect, the speed adjustment unit may cause a ratio of adjustment amounts of the revolution number of the spindle and the feedrate to change in accordance with an input of an operator.

A program recording medium according to a fourth aspect of the present invention is a program recording medium which non-transitorily records a program for controlling a machine tool which includes: at least one spindle for causing a cutting tool and a workpiece to rotate relatively, and at least one feed axis which causes the cutting tool to move relative to the workpiece, and cuts the workpiece by way of the cutting tool by causing the spindle and the feed axis to cooperatively operate, the program including: an upper limit value acquisition element which acquires an upper limit value for a cutting speed that is a relative speed of the cutting tool to the workpiece; a reference speed calculation element which calculates a revolution number of the spindle, and a feedrate that is a movement speed of the feed axis; an oscillation speed calculation element which calculates an oscillation speed that is superimposed on the feedrate; a cutting speed calculation element which calculates the cutting speed based on the revolution number of the spindle, the feedrate and the oscillation speed; and a speed adjustment element which adjusts at least either one of the revolution number of the spindle and the feedrate, so that a maximum value of the cutting speed calculated by the cutting speed calculation element does not exceed the upper limit value acquired by the upper limit value acquisition element.

A control method according to a fifth aspect of the present invention is a control method for controlling a machine tool which includes: at least one spindle for causing a cutting tool and a workpiece to rotate relatively, and at least one feed axis which causes the cutting tool to move relative to the workpiece, and cuts the workpiece by way of the cutting tool by causing the spindle and the feed axis to cooperatively operate, the control method including the steps of: acquiring an upper limit value for a cutting speed that is a relative speed of the cutting tool to the workpiece; calculating a revolution number of the spindle, and a feedrate that is a movement speed of the feed axis; calculating an oscillation speed that is superimposed on the feedrate; calculating the cutting speed based on the revolution number of the spindle, the feedrate and the oscillation speed; and adjusting at least either one of the revolution number of the spindle and the feedrate, so that a maximum value of the cutting speed calculated by in the step of calculating the cutting speed does not exceed the upper limit value acquired in the step of acquiring the upper limit value.

According to a numerical control device, a program recording medium and control method related to the present invention, it is possible to prevent the cutting speed of a cutting tool from becoming excessive upon performing oscillating cutting.

BRIEF DESCRIPTION OF THE DRAWINGS

FIG. 3 is a flowchart showing a control sequence of oscillating cutting in the machine tool of FIG. 1.

DETAILED DESCRIPTION OF THE INVENTION

Figure 1:
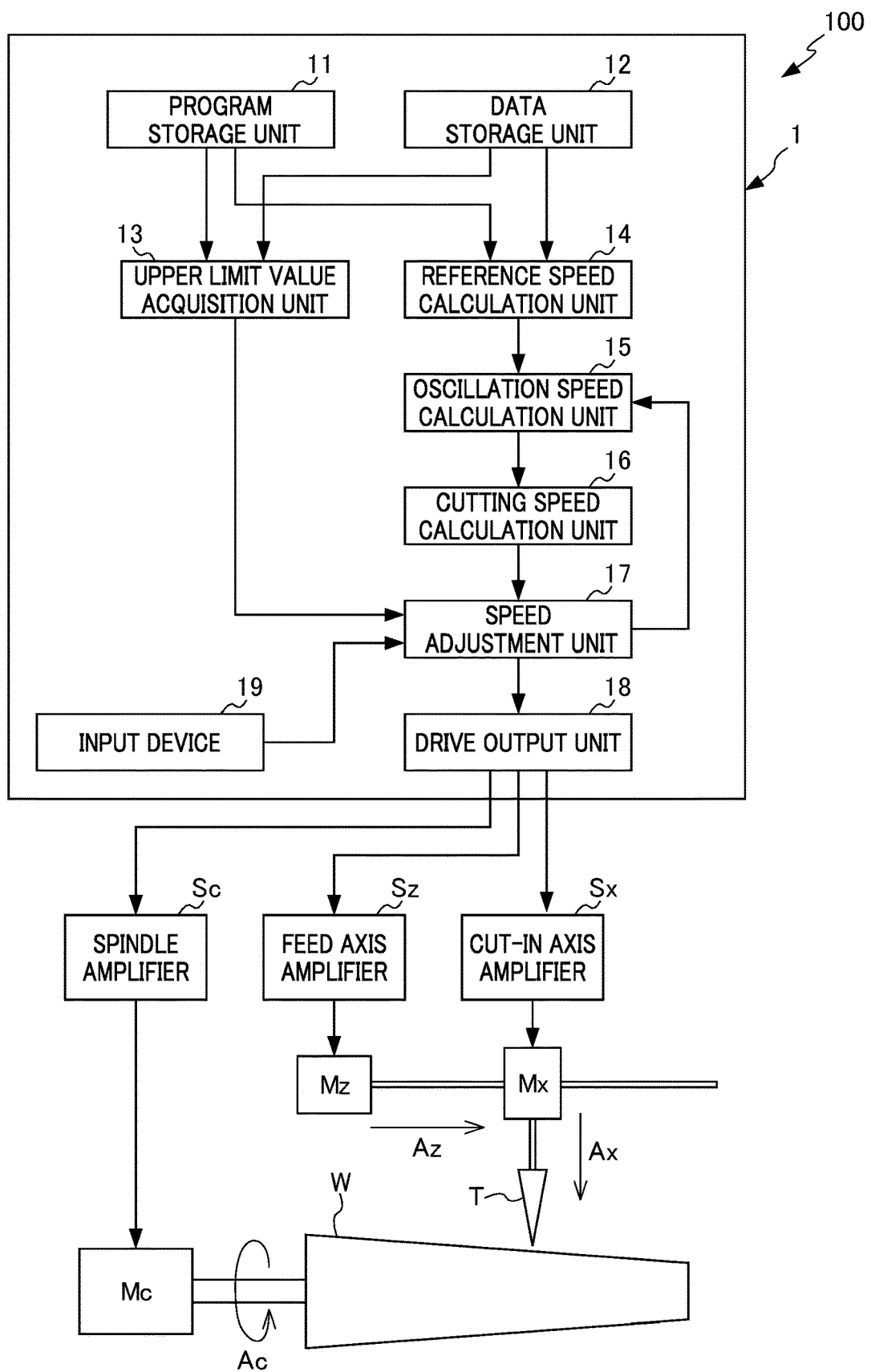
FIG. 1 is a block diagram showing the configuration of a machine tool including a numerical control device according to an embodiment of the present invention.
Figure 2:
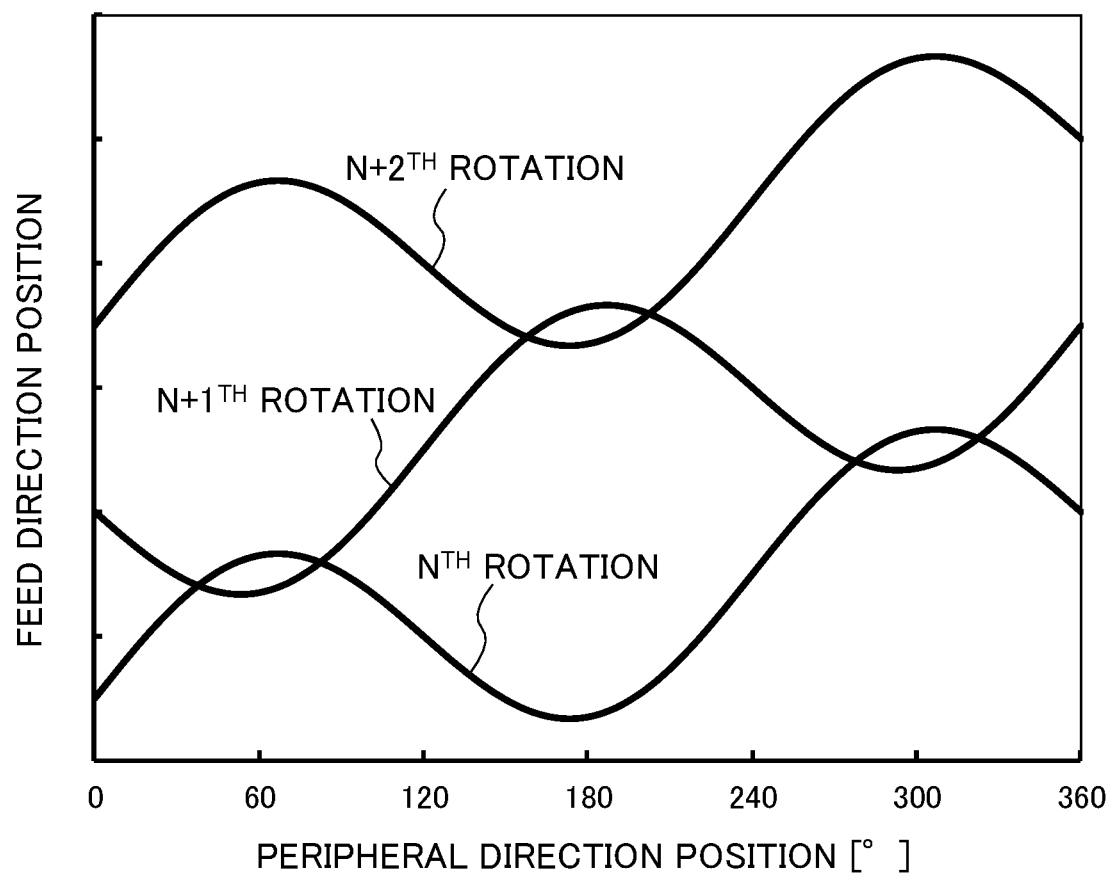
FIG. 2 is a view showing a trajectory of a cutting tool on a workpiece surface while machining by the machine tool of FIG. 1.

Hereinafter, an embodiment of the present invention will be explained while referencing the drawings. FIG. 1 is a block diagram showing the configuration of a machine tool 100 including a numerical control device 1 according to an embodiment of the present invention.

The machine tool 100 of the present embodiment is an NC lathe that cuts a workpiece W, which is a machining target, using a cutting tool T. The machine tool 100 includes the three control axes of a spindle Ac that causes a cutting tool and workpiece to relatively rotate (rotates the workpiece W in the present embodiment); a feed axis Az which causes the cutting tool T to move relative to the workpiece W (moves the cutting tool T in the present embodiment); and a cut-in axis Ax which causes the cutting tool T to move relative to the workpiece W in the radial direction of the spindle Ac (moves the cutting tool T in the present embodiment). For this reason, the machine tool 100 includes drive motors for driving these control axes Ac, Az, Ax (spindle motor Mc, feed axis motor Mz and cut-in axis motor Mx), and servo amplifiers for applying drive current to the respective drive motors Mc, Mz, Mx (spindle amplifier Sc, feed axis amplifier Sz and cut-in axis amplifier Sx).

The numerical control device 1 controls the machine tool 100 which cuts the workpiece W by way of the cutting tool T by cooperatively operating the spindle Ac, feed axis Az and cut-in axis Ax. The numerical control device 1 includes: a program storage unit 11, data storage unit 12, upper limit acquisition unit 13, reference speed calculation unit 14, oscillation speed calculation unit 15, cutting speed calculation unit 16, speed adjustment unit 17, drive output unit 18, and input device 19.

The numerical control device 1 is a device which implements the control method according to the present invention. In addition, the numerical control device 1 can be realized by reading a program according to the present invention into a computer having a CPU, memory, etc., for example. The program according to the present invention can be provided by recording onto a non-transitory recording medium. The respective constituent elements of the numerical control device 1 are distinguished in terms of function, and may not necessarily be elements which can be clearly separated in the structure of the program for realizing the physical configurations and numerical control device 1.

The program storage unit 11 stores a machining program which is inputted from outside. The machining program is written according to G code or the like, for example. The numerical control device 1 machines a workpiece W into a desired shape, by controlling the control axes Ac, Az, Ax of the machine tool 100 in accordance with the machining program.

The data storage unit 12 stores the general information required in the machining of the workpiece W. As information stored in the data storage unit 12, for example, it can include a table or the like defining the upper limit value ($vc_{limit}$[mm/s]) of the cutting speed (the relative speed (vc[mm/s]) of the cutting tool T relative to the surface of the workpiece W) for combinations of respective material properties of a plurality of workpieces W and a plurality of cutting tools T.

The upper limit value acquisition unit 13 references the information in the program storage unit 11 and data storage unit 12, and acquires the upper limit value $vc_{limit}$ of the cutting speed for the combination of the cutting tool T and workpiece W to be used.

The reference speed calculation unit 14 calculates the spindle revolution number (S[rev/min]), which is the revolution number of the spindle Ac, and the peripheral speed (f1[mm/s]) of the workpiece W by rotation of the spindle Ac, as well as the feedrate (v1[mm/s]), which is the movement speed of the feed axis Az and the feed amount per revolution (F[mm/rev]), which is the feed amount of the cutting tool T per one revolution of the spindle Ac, according to the machining program, for example. In more detail, the reference speed calculation unit 14 calculates the spindle revolution number S, peripheral speed f1, feed amount per revolution F and feedrate v1 which are optimal, in the case of not performing oscillation control according to the machining shape of the workpiece W written in the machining program. It should be noted that the peripheral speed f1 can be calculated as $\pi \cdot L \cdot S/60$, using the diameter (L[mm]) of the workpiece W. Based on the spindle revolution number S and feed amount per revolution F, the oscillation speed calculation unit 15 calculates the oscillation speed (vo(t) [mm/s]), which is a periodic speed fluctuation component that is superimposed on the feedrate v1, and is a function of time (t[s]). The oscillation speed calculation unit 15 may define the oscillation speed vo(t) as a speed component which sinusoidally fluctuates, so as to oscillate the position sinusoidally.

As an example, the oscillation speed calculation unit 15 causes the oscillation position (D[mm]), which is the deviation between the position of the feed axis Az in the case of performing oscillation control and the position in the case of not performing oscillation control, to change sinusoidally. More specifically, it is possible to define the frequency of the oscillation position D(t) as a value (S·I·60 [Hz]) arrived at by multiplying a constant (I) by the spindle revolution number S, and define the amplitude of the oscillation position D(t) as a value (K·F/2) arrived at by multiplying a constant (K) by the feed amount per revolution F and dividing by 2. In other words, the oscillation position D(t) can be expressed as K·F/2·cos(2π/60·S·I·t)−K·F/2. The oscillation speed Vo(t), due to being a value arrived at by differentiating the oscillation position D(t), can be calculated as −π/60·K·F·S·I*sin (2π/60·S·I·t).

The position in the feed axis Az direction of the cutting tool T is expressed as the total for the integrated values of feedrate v1 and oscillation speed vo(t). When this is shown as a change relative to the rotation angle of the spindle Ac, the trajectory of the cutting tool T during rotation of an $n^{th}$ time of the spindle Ac and the trajectory of the cutting tool T during rotation of an $n^{th+1}$ time of the spindle Ac can be made to differ by almost 180° in phase, for instance, by setting the constant I to a value close to an odd multiple of 0.5. For this reason, the circumferential direction position of the workpiece W at which the feed direction position of the cutting tool T becomes the maximum during the rotation of the $n^{th}$ time, and the circumferential direction position of the workpiece W at which the feed position of the cutting tool T becomes a minimum during rotation of the $n^{th+1}$ time will match.

In addition, the trajectory of the cutting tool T during rotation of the $n^{th}$ time of the spindle Ac and the trajectory of the cutting tool T during rotation of the $n^{th+1}$ time of the spindle Ac overlap once per cycle.

In the interval in which the trajectory of the cutting tool T during rotation of the $n^{th}$ time of the spindle Ac and the trajectory of the cutting tool T during rotation of the $n^{th+1}$ time of the spindle Ac overlap, the cutting tool T enters a state distanced in the feed axis Az direction from the workpiece W. The generation of chips formed from the material which the cutting tool T cut away from the workpiece W ends at the moment when the cutting tool T distances from the workpiece W. In other words, the chips are severed every cycle of oscillation of the cutting tool T.

The cutting speed calculation unit 16 calculates the cutting speed vc(t), which is a function of time t based on the peripheral speed f1, feedrate v1 and oscillation speed vo(t), as well as the shape of the workpiece W. More specifically, the cutting speed vc(t) is calculated as the vector sum of the speed calculated by adding the oscillation speed vo(t) to the feedrate vc, the peripheral speed of the workpiece W at the cutting edge position of the cutting tool T, and the speed in the cut-in axis Ax direction of the cutting tool T which moves along the shape of the workpiece W.

In order to reduce the computational load, the cutting speed calculation unit 16 may initially calculate the maximum value for the oscillation speed vo(t), and then calculate only the maximum value of the cutting speed vc(t) using the maximum value for the oscillation speed vo(t).

The speed adjustment unit 17 adjusts at least either one of the peripheral speed f1 and the feedrate v1, so that the maximum value for the cutting speed vc(t) calculated by the cutting speed calculation unit 16 does not exceed the upper limit value $vc_{limit}$ acquired by the upper limit acquisition unit 13. In other words, in a case of the maximum value for the cutting speed vc(t) calculated by the cutting speed calculation unit 16 exceeding the upper limit value $vc_{limit}$, the speed adjustment unit 17 changes at least one of the peripheral speed f1 and the feedrate v1 from the value calculated by the reference speed calculation unit 14, and causes recalculation in the oscillation speed calculation unit 15 and cutting speed calculation unit 16.

The speed adjustment unit 17 may be configured so as to adjust only either one among the peripheral speed f1 and feedrate v1. In this case, adjusting the peripheral speed f1 can relatively easily suppress the maximum value for the cutting speed vc(t) to no more than the upper limit value $vc_{limit}$. In addition, in the case of adjusting both the peripheral speed f1 and feedrate v1, the speed adjustment unit 17 may be configured so as to adjust the peripheral speed f1 and feedrate v1 so that the ratio of adjustment amounts of the peripheral speed f1 and federate v1, or the contribution of the adjustment amounts of the peripheral speed f1 and feedrate v1 relative to the change amount in the maximum value of the cutting speed vc(t) becomes constant, may be configured so as to perform a rough adjustment to one of the peripheral speed f1 and feedrate v1, and perform fine adjustment on the other, or may be configured so as to adjust the other one only in the case of the adjustment amount of one of the peripheral speed f1 and feedrate v1 reaching a predetermined upper limit.

In addition, the speed adjustment unit 17 may cause the ratio of adjustment amounts of the peripheral speed f1 and feedrate v1 in the adjustment of the maximum value for the cutting speed vc(t) to change in accordance with another parameter (not only in a case of directly designating the ratio of adjustment amounts, but also including a case of the ratio of adjustment amounts changing as a result). The parameter causing the ratio of adjustment amounts to change may be written into the machining program, or the operator may input it using the input device 19.

By causing the ratio of adjustment amounts of the peripheral speed f1 and feedrate v1 to change in the adjustment of the maximum value for the cutting speed vc(t), it is possible to minimize the influence on the machining precision, machining time, etc. depending on the respective machining (conditions such as material properties of workpiece W, machined shape, type of cutting tool, etc.). By causing the ratio of the adjustment amounts of the peripheral speed f1 and feedrate v1 to change in accordance with the machining program, it is possible to reliably optimize each machining. In addition, by causing the ratio of adjustment amounts of the peripheral speed f1 and feedrate v1 to change in accordance with the machining program, it is possible to optimize machining also in a case of using a machining program which does not write such a parameter.

The ratio change in the adjustment amounts of the peripheral speed f1 and feedrate v1 is not only directly designating the ratio of the adjustment amounts of the peripheral speed f1 and feedrate v1, but can also be brought about by setting the upper limit for the adjustment amounts of the peripheral speed f1 and feedrate v1 (including a case of setting one as adjustment disabled), and designating the contribution degrees of the adjustment amounts of the peripheral speed f1 and feedrate v1 relative to the change amount in the maximum value for the cutting speed vc(t), for example.

The drive output unit 18 inputs command signals to the spindle amplifier Sc, feed axis amplifier Sz and cut-in axis amplifier Sx, so as to relatively move the workpiece W and cutting tool at the adjusted peripheral speed f1, feedrate v1 and oscillation speed vo(t).

So long as the input device 19 allows input by the user, it can be established as a configuration having a keyboard, touch panel, switches, etc., for example, and may be an interface or the like for communicating with a terminal or higher order control device used by the user.

As is evident from the above explanation, an embodiment which is a program according to the present invention which realizes the numerical control device 1 can include: an upper limit value acquisition element which realizes the upper limit value acquisition unit 13 that acquires the upper limit value $vc_{limit}$ for the cutting speed vc; a reference speed calculation element which realizes the reference speed calculation unit 14 that calculates the peripheral speed f1 and feedrate v1 in accordance with a machining program; an oscillation speed calculation element which realizes the oscillation speed calculation unit 15 that calculates the oscillation speed vo(t) based on the peripheral speed f1 and feedrate v1; a cutting speed calculation element which realizes the cutting speed calculation unit 16 that calculates the cutting speed vc(t); and a speed adjustment element which realizes the speed adjustment unit 17 that adjusts at least either of the peripheral speed f1 and feedrate v1 so that the maximum value for the cutting speed vc(t) does not exceed the upper limit value $vc_{limit}$ acquired by the upper limit acquisition element.

In addition, as shown in FIG. 3, a control method of an embodiment which is a control method according to the present invention implemented by the numerical control device 1 can include: a step of acquiring the upper limit value $vc_{limit}$ for the cutting speed vc (Step S1: upper limit value acquisition step); a step of calculating the peripheral speed f1 and feedrate v1 in accordance with a machining program (Step S2: reference speed calculation step); a step of calculating the oscillation speed vo(t) based on the spindle revolution number S and feedrate v1 (Step S3: oscillation speed calculation step); a cutting step of calculating the cutting speed vc(t) (Step S4: cutting speed calculation step); a step of adjusting at least either one of the peripheral speed f1 and feedrate v1 so that the maximum value for the cutting speed vc(t) does not exceed the upper limit value $vc_{limit}$ (Step S4: speed adjustment step); and a step of storing the adjusted cutting speed vc(t) (Step S6: storage step).

The speed adjustment step of Step S5 can include a step of confirming whether or not the maximum value for the cutting speed vc(t) exceeds the maximum value $vc_{limit}$ (Step S51: confirmation step); and a step of changing at least either one of the peripheral speed f1 and feedrate v1 in the case of determining that the maximum value for the cutting speed vc(t) exceeds the upper limit value $vc_{limit}$ in the conformation step of Step S51 (Step S52: change step). In the case of executing the change step of Step S52, the processing returns to the oscillation speed calculation step of Step S3 to recalculate the oscillation speed vo(t), and then the cutting speed vc(t) is recalculated in the cutting speed calculation step of Step S4, followed by comparing the maximum value for the cutting speed vc(t) and upper limit value $vc_{limit}$ in the conformation step of Step S51 again.

The numerical control device 1, program for realizing the numerical control device 1, and the control method implemented by the numerical control device 1, upon performing oscillating cutting in the machine tool 100, can prevent the cutting speed vc(t) from becoming excessive, and specifically, can suppress the cutting speed vc(t) to no more than the upper limit value $vc_{limit}$. Conversely, the numerical control device 1, program for realizing the numerical control device 1, and the control method implemented by the numerical control device 1 can suppress an increase in machining time, by increasing the peripheral speed f1 and feedrate vz within ranges that can suppress the cutting speed vc(t) to no more than the upper limit value $vc_{limit}$.

Although an embodiment of the present invention has been explained above, the present invention is not to be limited to the aforementioned embodiment. In addition, the effects described in the present embodiment are merely listing the most preferred effects produced from the present invention, and the effects according to the present invention are not to be limited to those described in the present embodiment.

As an example, the numerical control device, program and control method according to the present invention may not necessarily be able to change the ratio of adjustment amounts of the peripheral speed and feedrate.

In the numerical control device, program and control method according to the present invention, the waveform of the oscillation speed is not limited to sinusoidal waveform, and may cyclically change as a sawtooth wave, triangular wave, trapezoidal wave, square wave or the like.

The numerical control device, program and control method according to the present invention may control the spindle revolution number so that the peripheral speed of the workpiece becomes constant. In other words, in the numerical control device, program and control method according to the present invention, the peripheral speed may be calculated as a function of time.

The numerical control device, program and control method according to the present invention are not limited to lathes, and can also be applied to the control of a drilling machine or the like, for example.

EXPLANATION OF REFERENCE NUMERALS 1 numerical control device
13 upper limit value acquisition unit
14 reference speed calculation unit
15 oscillation speed calculation unit
16 cutting speed calculation unit
17 speed adjustment unit
18 drive output unit
100 machine tool
Ac spindle
Az feed axis
T cutting tool
W workpiece

What is claimed is:

1. A numerical control device for controlling a machine tool which includes: at least one spindle for causing a cutting tool and a workpiece to rotate relatively, and at least one feed axis which causes the cutting tool to move relative to the workpiece, and cuts the workpiece by way of the cutting tool by causing the spindle and the feed axis to cooperatively operate, the numerical control device comprising:
an upper limit value acquisition unit which acquires an upper limit value for a cutting speed that is a relative speed of the cutting tool to the workpiece;
a reference speed calculation unit which calculates a revolution number of the spindle, and a feedrate that is a movement speed of the feed axis;
an oscillation speed calculation unit which calculates an oscillation speed that is superimposed on the feedrate;
a cutting speed calculation unit which calculates the cutting speed based on the revolution number of the spindle, the feedrate and the oscillation speed; and a speed adjustment unit which adjusts at least either one of the revolution number of the spindle and the feedrate, so that a maximum value of the cutting speed calculated by the cutting speed calculation unit does not exceed the upper limit value acquired by the upper limit value acquisition unit.

2. The numerical control device according to claim 1, wherein the speed adjustment unit causes a ratio of adjustment amounts of the revolution number of the spindle and the feedrate to change in accordance with a machining program.

3. The numerical control device according to claim 1, wherein the speed adjustment unit causes a ratio of adjustment amounts of the revolution number of the spindle and the feedrate to change in accordance with an input of an operator.

4. A recording medium which non-transitorily records a program for controlling a machine tool which includes: at least one spindle for causing a cutting tool and a workpiece to rotate relatively, and at least one feed axis which causes the cutting tool to move relative to the workpiece, and cuts the workpiece by way of the cutting tool by causing the spindle and the feed axis to cooperatively operate, the program comprising:
- an upper limit value acquisition element which acquires an upper limit value for a cutting speed that is a relative speed of the cutting tool to the workpiece;
- a reference speed calculation element which calculates a revolution number of the spindle, and a feedrate that is a movement speed of the feed axis;
- an oscillation speed calculation element which calculates an oscillation speed that is superimposed on the feedrate;
- a cutting speed calculation element which calculates the cutting speed based on the revolution number of the spindle, the feedrate and the oscillation speed; and
- a speed adjustment element which adjusts at least either one of the revolution number of the spindle and the feedrate, so that a maximum value of the cutting speed calculated by the cutting speed calculation element does not exceed the upper limit value acquired by the upper limit value acquisition element.

5. A control method for controlling a machine tool which includes: at least one spindle for causing a cutting tool and a workpiece to rotate relatively, and at least one feed axis which causes the cutting tool to move relative to the workpiece, and cuts the workpiece by way of the cutting tool by causing the spindle and the feed axis to cooperatively operate, the control method comprising the steps of:
- acquiring an upper limit value for a cutting speed that is a relative speed of the cutting tool to the workpiece;
- calculating a revolution number of the spindle, and a feedrate that is a movement speed of the feed axis;
- calculating an oscillation speed that is superimposed on the feedrate;
- calculating the cutting speed based on the revolution number of the spindle, the feedrate and the oscillation speed; and
- adjusting at least either one of the revolution number of the spindle and the feedrate, so that a maximum value of the cutting speed calculated by in the step of calculating the cutting speed does not exceed the upper limit value acquired in the step of acquiring the upper limit value.

6. A numerical control device for controlling a machine tool which includes a cutting tool, at least one spindle for causing a workpiece to rotate on an axis, and at least one feed axis which causes the cutting tool to move relative to the workpiece, and cuts the workpiece by way of the cutting tool by causing the spindle and the feed axis to cooperatively operate, the numerical control device comprising:
- an upper limit value acquisition unit which acquires an upper limit value for a cutting speed that is a relative speed of the cutting tool to the workpiece;
- a reference speed calculation unit which calculates a revolution number of the spindle, and a feedrate that is a movement speed of the feed axis;
- an oscillation speed calculation unit which calculates an oscillation speed that is superimposed on the feedrate;
- a cutting speed calculation unit which calculates the cutting speed based on the revolution number of the spindle, the feedrate and the oscillation speed; and
- a speed adjustment unit which adjusts at least either one of the revolution number of the spindle and the feedrate, so that a maximum value of the cutting speed calculated by the cutting speed calculation unit does not exceed the upper limit value acquired by the upper limit value acquisition unit.

\* \* \* \* \*